United States Patent
Abramson et al.

(10) Patent No.: US 12,482,464 B2
(45) Date of Patent: Nov. 25, 2025

(54) CONTROLLING INTERACTIVE AGENTS USING MULTI-MODAL INPUTS

(71) Applicant: DeepMind Technologies Limited, London (GB)

(72) Inventors: Joshua Simon Abramson, London (GB); Arun Ahuja, London (GB); Federico Javier Carnevale, London (GB); Petko Ivanov Georgiev, London (GB); Chia-Chun Hung, London (GB); Timothy Paul Lillicrap, London (GB); Alistair Michael Muldal, London (GB); Adam Anthony Santoro, London (GB); Tamara Louise von Glehn, Cambridge (GB); Jessica Paige Landon, London (GB); Gregory Duncan Wayne, London (GB); Chen Yan, London (GB); Rui Zhu, Beaconsfield (CA)

(73) Assignee: DeepMind Technologies Limited, London (GB)

( * ) Notice: Subject to any disclaimer, the term of this patent is extended or adjusted under 35 U.S.C. 154(b) by 383 days.

(21) Appl. No.: 18/077,194

(22) Filed: Dec. 7, 2022

(65) Prior Publication Data
US 2023/0178076 A1 Jun. 8, 2023

Related U.S. Application Data

(60) Provisional application No. 63/286,999, filed on Dec. 7, 2021.

(51) Int. Cl.
*G10L 15/22* (2006.01)
*G06F 40/284* (2020.01)
(Continued)

(52) U.S. Cl.
CPC ............ *G10L 15/22* (2013.01); *G06F 40/284* (2020.01); *G06F 40/40* (2020.01); *G06V 10/774* (2022.01);
(Continued)

(58) Field of Classification Search
USPC ........................................ 704/231, 232, 275
See application file for complete search history.

(56) References Cited

U.S. PATENT DOCUMENTS 11,921,824 B1 * 3/2024 Hester .................... G06N 3/045
2019/0354567 A1 * 11/2019 Dehghani ............ G06N 3/0455
(Continued)

FOREIGN PATENT DOCUMENTS

JP  2020-075302 A   5/2020
JP  2020-530602 A   10/2020
(Continued)

OTHER PUBLICATIONS

International Preliminary Report on Patentability International Appln. No. PCT/EP2022/084780, dated Jun. 5, 2024, 15 pages.
(Continued)

*Primary Examiner* — Leonard Saint-Cyr
(74) *Attorney, Agent, or Firm* — Fish & Richardson P.C.

(57) ABSTRACT

Methods, systems, and apparatus, including computer programs encoded on a computer storage medium, for controlling agents. In particular, an interactive agent can be controlled based on multi-modal inputs that include both an observation image and a natural language text sequence.

33 Claims, 8 Drawing Sheets

(51) Int. Cl.
| | |
|---|---|
| G06F 40/40 | (2020.01) |
| G06V 10/774 | (2022.01) |
| G06V 10/82 | (2022.01) |
| G06V 20/50 | (2022.01) |
| G10L 13/02 | (2013.01) |
| G10L 15/06 | (2013.01) |
| G10L 15/16 | (2006.01) |

(52) U.S. Cl.
CPC .............. *G06V 10/82* (2022.01); *G06V 20/50* (2022.01); *G10L 13/02* (2013.01); *G10L 15/063* (2013.01); *G10L 15/16* (2013.01); *G10L 2015/223* (2013.01)

(56) References Cited

U.S. PATENT DOCUMENTS

| | | | | |
|---|---|---|---|---|
| 2022/0245424 | A1* | 8/2022 | Goyal | G06V 10/82 |
| 2022/0366263 | A1* | 11/2022 | Ji | G06N 3/088 |
| 2022/0383078 | A1* | 12/2022 | Hou | G06N 3/06 |
| 2023/0019211 | A1* | 1/2023 | Wang | G06N 3/0464 |
| 2023/0031702 | A1* | 2/2023 | Li | G06V 10/82 |
| 2023/0073154 | A1* | 3/2023 | Paxton | G06F 40/30 |

FOREIGN PATENT DOCUMENTS

| | | |
|---|---|---|
| JP | 2021-509979 A | 4/2021 |
| WO | WO 2021/005540 A2 | 1/2021 |
| WO | WO 2021/152515 A1 | 8/2021 |

OTHER PUBLICATIONS

Office Action in Japanese Appln. No. 2024-521004, dated Dec. 16, 2024, 5 pages (with English translation).
Abramson et al., "Imitating interactive intelligence," CoRR, Jan. 21, 2021, arXiv:2012.05672v2, 96 pages.
Adiwardana et al., "Towards a human-like open-domain chatbot," CoRR, Jan. 27, 2020 arXiv:2001.09977, 38 pages.
Alayrac et al., "Self-supervised multimodal versatile networks," Advances in Neural Information Processing Systems 33 (NeurIPS 2020), 13 pages.
Anderson et al., "Vision-and-language navigation: Interpreting visually grounded navigation instructions in real environments," CoRR, Nov. 20, 2017, arxiv.org/abs/1711.07280, 13 pages.
Brown et al., "Language models are few-shot learners," CoRR, Jul. 22, 2020, arXiv:2005.14165, 75 pages.
Byrne, "Animal imitation," Current Biology, Feb. 10, 2009, 19(3):R111-R114.
Chomsky, "A review of B.F.'s Skinner's verbal behavior," Language, 1959, 35(1):26-58.
Christiano et al., "Deep reinforcement learning from human preferences," CoRR, Jun. 12, 2017, arXiv:1706.03741, 17 pages.
Das et al., "Embodied question answering," Proceedings of the IEEE Conference on Computer Vision and Pattern Recognition Workshops (CVPR), 2018, pp. 2054-2063.
Devlin et al., "Bert: Pre-training of deep bidirectional transformers for language understanding, " CoRR, Oct. 11, 2018, arXiv:1810.04805, 16 pages.
Dosovitskiy et al., "An image is worth 16×16 words: Transformers for image recognition at scale," CoRR, Oct. 22, 2020, arXiv:2010.11929, 22 pages.
Dunbar, "Coevolution of neocortical size, group size and language in humans," Behavioral and Brain Sciences, Dec. 1993, 16(4):681-694.
Galashov et al., "Information asymmetry in kl-regularized rl," CoRR, May 3, 2019, arXiv:1905.01240, 25 pages.
Harnad, "The symbol grounding problem," Physica D: Nonlinear Phenomena, Jun. 1990, 42(1-3):335-346.

He et al., "Deep residual learning for image recognition," Proceedings of the IEEE Conference on Computer Vision and Pattern Recognition (CVPR), 2016, pp. 770-778.
Hill et al., "Robust instruction-following in a situated agent via transfer-learning from text," ICLR, 2019, 18 pages.
International Search Report and Written Opinion in International Appln. No. PCT/EP2022/084780, dated Mar. 7, 2023, 21 pages.
Jang et al., "BC-0: Zero-shot task generalization with robotic imitation learning," Proceedings of the 5th Conference on Robot Learning, 2022, 164;991-1002.
Jessica Landon [online], "Creating Multimodal Interactive Agents with Imitation and Self-Supervised Learning," Dec. 7, 2015, retrieved on Apr. 10, 2024, <https://www.youtube.com/watch?v=ZFgRhviF7mY> [Video Submission].
Kaplan et al., "Scaling laws for neural language models," CoRR, Jan. 23, 2020, arXiv:2001.08361, 30 pages.
Khan et al., "Transformers in vision: a survey," CoRR, Sep. 8, 2021, arXiv:2101.01169v3, 28 pages.
Lake et al., "Word meaning in minds and machines," Psychological Review, 2021, 130(2):401-431.
Laland, "Social learning strategies," Animal Learning & Behavior, Feb. 2004, 32(1):4-14.
Landi et al., "Perceive, Transform, and Act: Multi-Modal Attention Networks for Vision and Language Navigation," CoRR, Nov. 27, 2019, arXiv;1911.12377v1, 10 pages.
Lynch et al., "Grounding language in play," CoRR, May 15, 2020, arXiv:2005.07648, 18 pages.
McClelland et al., "Extending machine language models toward human-level language understanding," CoRR, Dec. 12, 2019, arXiv:1912.05877, 8 pages.
Ortega et al., "Shaking the foundations: delusions in sequence models for interaction and control," CoRR, Oct. 20, 2021, arXiv:2110.10819, 16 pages.
Osa et al., "An algorithmic perspective on imitation learning," CoRR, Nov. 16, 2018, arXiv:1811.06711, 188 pages.
Pomerleau, "Alvinn: An autonomous land vehicle in a neural network," Advances in Neural Information Processing Systems, 1988, pp. 305-313.
Radford et al., "Language models are unsupervised multitask learners," OpenAI Blog, 2019, 1(8):9.
Ross et al., "A reduction of imitation learning and structured prediction to no-regret online learning," Proceedings of the 14th International Conference on Artificial Intelligence and Statistics, 2011, pp. 627-635.
Roy et al., "The human speechome project," International Workshop on Emergence and Evolution of Linguistic Communication, 2006, pp. 192-196.
Santoro et al., "Symbolic behaviour in artificial intelligence," CoRR, Feb. 5, 2021, arXiv:2102.03406, 17 pages.
Schaal, "Is imitation learning the route to humanoid robots?," Trends in Cognitive Sciences, Jun. 1, 1999, 3(6):233-242.
Seo et al., "Look before you speak: Visually contextualized utterances," 2021 IEEE/CVF Conference on Computer Vision and Pattern Recognition, Jun. 20, 2021, 16872-16882.
Silver et al., "Mastering the game of go with deep neural networks and tree search," Nature, 2016, 529(7587):484-489.
Sullivan et al., "SAYcam: A large, longitudinal audiovisual dataset recorded from the infant's perspective," Open Mind, May 26, 2021, 5:20-29.
Turing, "Computing machinery and intelligence," Mind, Oct. 1950, LIX(236):433-460.
Vaswani et al., "Attention is all you need," Advances in neural information processing systems, 2017, pp. 5998-6008.
Vinyals et al., "Grandmaster level in starcraft II using multi-agent reinforcement learning," Nature, Oct. 30, 2019, 575(7782):350-354.
Ward et al., "Using unity to help solve intelligence," CoRR, Nov. 18, 2022, arXiv:2011.09294, 15 pages.
Winograd, "Understanding natural language," Cognitive Psychology, Jan. 1972, 3(1):1-191.
Wu et al., "Cvt: Introducing convolutions to vision transformers," Proceedings of the IEEE/CVF International Conference on Computer Vision (ICCV), 2021, pp. 22-31.

(56) References Cited

OTHER PUBLICATIONS

Yoshida et al., "What's in view for toddlers? Using a head camera to study visual experience," Infancy, May-Jun. 2008, 13(3):229-248.

Notice of Allowance in Japanese Appln. No. 2024-521004, mailed on Mar. 25, 2025, 5 pages (with English translation).

* cited by examiner

CONTROLLING INTERACTIVE AGENTS USING MULTI-MODAL INPUTS

CROSS-REFERENCE TO RELATED APPLICATION

This application claims priority to U.S. Provisional Application No. 63/286,999 filed on Dec. 7, 2021, the disclosure of which is incorporated in its entirety into this application.

BACKGROUND

This specification relates to controlling agents using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations that controls an interactive agent that is interacting in an environment by selecting actions to be performed by the agent and then causing the agent to perform the actions.

The agent is referred to as an "interactive" agent because the agent interacts with one or more other agents in the environment as part of interacting with the environment. The one or more other agents can include humans, other agents controlled by different computer systems, or both. The interactive agent interacts with the other agent(s) by receiving communications generated by the other agent(s) and, optionally, generating text that is communicated to the other agent(s).

In particular, the interactions with the other agents provide information to the interactive agent about what task the agent should be performing in the environment at any given time.

In one aspect, a method for controlling an agent interacting with an environment comprises, at each of a plurality of time steps: receiving an observation image characterizing a state of the environment at the time step; receiving a natural language text sequence for the time step that characterizes a task being performed by the agent in the environment at the time step; processing the observation image using an image embedding neural network to generate a plurality of image embeddings that represent the observation image; processing the natural language text sequence using a text embedding neural network to generate a plurality of text embeddings that represent the natural language text sequence; processing an input comprising the image embeddings and the text embeddings using a multi-modal Transformer neural network to generate an aggregated embedding, wherein the multi-modal Transformer neural network is configured to (i) apply self-attention over at least the text embeddings and the image embeddings to generate respective updated embeddings for at least the plurality of text embeddings and (ii) generate the aggregated embedding from at least the respective updated embeddings for the text embeddings; selecting, using the aggregated embedding, one or more actions to be performed by the agent in response to the observation image; and causing the agent to perform the one or more selected actions. Thus, the multi-modal Transformer effectively aggregates both image and text embeddings to allow the agent to be effectively controlled given any of a variety of image and text inputs, e.g., to perform a task defined by the text input given that the environment is in a state characterized by the image input.

In some implementations, the multi-modal Transformer neural network comprises one or more self-attention layers that each have one or more self-attention heads, and wherein applying self-attention comprises processing the input through the one or more self-attention layers.

In some implementations, the input to the multi-modal Transformer neural network comprises the image embeddings, the text embeddings, and one or more dedicated embeddings.

In some implementations, applying self-attention comprises generating respective updated embeddings for the text embeddings and the dedicated embeddings without updating the image embeddings.

In some implementations, each self-attention head of each self-attention layer is configured to: receive a head input comprising (i) the image embeddings generated by the image embedding neural network and (ii) respective current embeddings for the text embeddings and the dedicated embeddings; generate, from the respective current embeddings, a respective query corresponding to each text embedding and each dedicated embedding; generate, from the image embeddings and the respective current embeddings, a respective key corresponding to each image embedding, each text embedding, and each dedicated embedding; generate, from the image embeddings and the respective current embeddings, a respective value corresponding to each image embedding, each text embedding, and each dedicated embedding; and apply query-key-value attention over the respective queries, keys, and values to generate a respective initial updated embedding for each text embedding and each dedicated embedding without updating the image embeddings. Thus, the Transformer makes use of the image embeddings only to provide "context" for updating the text and dedicated embeddings, thereby improving the ability of the Transformer to accurately characterize a variety of different scenes and a variety of different of text instructions while remaining computationally efficient.

In some implementations, generating the aggregated embedding comprises: aggregating the respective updated embeddings for the text embeddings and the dedicated embeddings to generate an initial aggregated embedding; and combining the respective updated embeddings for the dedicated embeddings with the initial aggregated embedding to generate the aggregated embedding.

In some implementations, the combining comprises concatenating each respective updated embedding for each dedicated embedding and the initial aggregated embedding.

In some implementations, selecting, using the aggregated embedding, one or more actions to be performed by the agent in response to the observation image comprises: generating a state representation from the aggregated embedding; and selecting the one or more actions using the state representation.

In some implementations, generating the state representation comprises processing the aggregated embedding using a memory neural network. This allows the state representation to condition on previously received observation images and natural language instructions as well as those received at the current time step.

In some implementations, the memory neural network is a recurrent neural network.

In some implementations, the method further comprises processing the state representation using a natural language generation neural network to generate an output text sequence for the time step. Thus, the system can also cause the agent to generate output text that is made available to other agents in the environment, e.g., to obtain clarification about how a task should be performed or to provide information about the output of the task to the other agent(s).

In some implementations, the natural language text sequence is generated by transcribing a verbalized utterance from another agent in the environment, and wherein the method further comprises: generating speech representing the output text sequence for the time step; and causing the agent to verbalize the generated speech In some implementations, the method further comprises processing the state representation using a text no-op neural network to generate an indication of whether text should be generated at the time step; and processing the state representation for the time step using a natural language generation neural network to generate an output text sequence for the time step comprises: only generating the output text sequence when the indication indicates that text should be generated at the time step.

In some implementations, selecting the one or more actions using the state representation comprises: processing the state representation using an action policy neural network to select a single action to be performed in response to the image observation.

In some implementations, selecting the one or more actions using the state representation comprises: processing the state representation to select a sequence of a plurality of actions to be performed in response to the image observation, the sequence comprising a respective action at each of a plurality of positions.

In some implementations, processing the state representation comprises: processing the state representation using a high-level controller neural network to generate a respective low-level input for each position in the sequence; and for each position, processing the respective low-level input for the position using a policy neural network to select the action to be performed by the agent at the position in the sequence.

In some implementations, the high-level controller neural network auto-regressively generates the respective low-level inputs for each position in the sequence after receiving as input the state representation.

In some implementations, the high-level controller neural network is a recurrent neural network.

In some implementations, the method further comprises: processing the state representation using an action no-op neural network to generate an indication of whether any actions should be performed at the time step; and causing the agent to perform the one or more actions comprises: only causing the agent to perform the actions when the indication indicates that actions should be performed at the time step.

In some implementations, the natural language text sequence is generated by transcribing a verbalized utterance from another agent in the environment.

In another aspect, another method for controlling an agent interacting with an environment comprises, at each of a plurality of time steps: receiving an observation image for the time step characterizing a state of the environment at the time step; receiving a natural language text sequence for the time step that characterizes a task being performed by the agent in the environment at the time step; processing the observation image and the natural language text sequence to generate a state representation for the time step; generating a sequence of a plurality of actions to be performed by the agent in response to the observation image at the time step, the sequence comprising a respective action to be performed by the agent at each of a plurality of positions, the generating comprising: processing the state representation using a high-level controller neural network to generate a respective low-level input for each position in the sequence; and for each position, processing the respective low-level input for the position using an action policy neural network to generate the action to be performed by the agent at the position in the sequence; and causing the agent to perform the sequence of actions. Thus, the system can effectively control the agent with reduced latency, e.g., because multiple actions are performed in response to each observation image, the system can capture observation images at a reduced frequency and fewer processing iterations are required to control the agent, while still effectively controlling agent due to the hierarchical nature of the action selection process.

In some implementations, the method further comprises processing the state representation for the time step using a natural language generation neural network to generate an output text sequence for the time step.

In some implementations, the natural language text sequence is generated by transcribing a verbalized utterance from another agent in the environment, and the method further comprises: generating speech representing the output text sequence for the time step; and causing the agent to verbalize the generated speech.

In some implementations, the method further comprises: processing the state representation using a text no-op neural network to generate an indication of whether text should be generated at the time step; and processing the state representation for the time step using a natural language generation neural network to generate an output text sequence for the time step comprises: only generating the output text sequence when the indication indicates that text should be generated at the time step.

In some implementations, the method further comprises processing the state representation using an action no-op neural network to generate an indication of whether any actions should be performed at the time step; and causing the agent to perform the sequence of actions comprises: only causing the agent to perform the sequence of actions when the indication indicates that actions should be performed at the time step.

In some implementations, the high-level controller neural network auto-regressively generates the respective low-level inputs for each position in the sequence after receiving as input the state representation.

In some implementations, the action policy neural network comprises a respective sub-network for each of a plurality of sub-actions, and wherein processing the respective low-level input for the position using an action policy neural network to generate the action to be performed by the agent at the position in the sequence comprises: for each of the plurality of sub-actions, processing an input comprising the respective low-level input for the position using the sub-network for the sub-action to select a value for the sub-action for the position.

In some implementations, for at least one of the sub-actions, the input comprises the value selected for one or more of the other sub-actions at the position.

In another aspect, a method is described for training a perceptual encoder neural network that is configured to receive as input an observation image characterizing a state of an environment at a time step and a natural language text sequence characterizing the environment and to generate as output an encoded representation for the time step. The method comprises: obtaining a plurality of training pairs, the plurality of training pairs comprising: (i) a first pair comprising an observation image and a natural language text sequence that both correspond to the same time step, and (ii) one or more second pairs each comprising an observation image and a natural language text sequence that correspond to different time steps; processing each training pair using the perceptual encoder neural network to generate a respective encoded representation for each training pair; processing the respective encoded representation for each training pair using a discriminator neural network that is configured to process the respective encoded representations to generate, for each training pair, a respective discriminator score that represents a likelihood that the observation image and the natural language text sequence in the pair from which the encoded representation was generated correspond to the same time step; and training the perceptual encoder neural network using a contrastive learning loss based on the respective discriminator scores for each training pair.

In some implementations, the perceptual encoder neural network includes the text embedding neural network, the image embedding neural network, and the multi-modal Transformer neural network of any of the methods described above, and the encoded representation is the aggregated embedding generated by the multi-modal Transformer neural network. In other implementations, the perceptual encoder can be a different type of multi-modal neural network, e.g., a convolutional neural network or a recurrent neural network.

In some implementations, the contrastive learning loss encourages the respective discriminator score for the first pair to be higher while encouraging the respective discriminator scores for the second pairs to be lower.

In some implementations, the discriminator neural network is a feedforward neural network that processes each encoded representation independently to generate the respective discriminator score for the corresponding training pair.

In some implementations, the method further comprises: generating, from the encoded representation for the first training pair and using at least a policy neural network, a respective probability distribution over a set of actions for each of one or more positions in an action sequence; obtaining data specifying a respective ground truth action performed by an expert agent at each of the one or more positions; and training at least the policy neural network and the perceptual encoder neural network based on a behavior cloning loss that measures, for each position in the action sequence, the probability assigned to the ground truth action at the position by the probability distribution for the position.

In some implementations, the method further comprises: training the discriminator neural network on an objective function that measures, for the first training pair, an error between the respective discriminator score for the first training pair and a first score that indicates that the observation image and the text sequence in the pair correspond to the same time step and, for each second training pair, an error between the respective discriminator score for the second training pair and a second score that indicates that the observation image and the text sequence in the pair do not correspond to the same time step.

Particular embodiments of the subject matter described in this specification can be implemented so as to realize one or more of the following advantages.

This specification generally describes techniques for controlling an interactive agent to perform tasks that are specified by natural language instructions issued by other agents in the environment.

Controlling such agents can be particularly valuable in many real-life tasks that require an agent to perform a variety of tasks that are described by statements made by other agents, e.g., humans or agents controlled using other policies, rather than tasks that are fixed in advance. However, training data for these types of tasks can be difficult to collect and, due to the open-ended nature of the tasks, cannot encompass the wide variety of tasks that the agent may be instructed to perform after training.

To allow the system to effectively control the agent even with these challenges, this specification describes a variety of techniques that can be used together or separately to improve interactive agent control and to allow the system to effectively control agents to perform new tasks that were not seen in training data.

As one example, this specification describes a neural network (a "perceptual encoder") that effectively combines multi-modal inputs to generate an encoded representation of the environment. This allows the system to generate accurate representations of environment states that result in more accurate control that better generalizes to new tasks.

As another example, this specification describes a hierarchical action selection policy (that makes use of a high-level controller and an action policy neural network) that allows the system to effectively select a sequence of multiple actions in response to a single observation. Accurately selecting multiple actions in response to an observation can improve agent performance. For example, by forcing the agent to act multiple times between adjacent observations, adjacent observations become more visually distinct, which can assist in learning (consider the converse scenario if the agent were forced to act with a higher frequency: adjacent observations would be nearly identical but have potentially different target policies, which creates complications for learning). As another example, implementing hierarchical control can allow the system to learn useful hierarchical policies, wherein its lower-level controller captures repeatable action sequences that merely need to be triggered by the higher-level controller.

As yet another example, this specification describes a multi-modal contrastive loss that can be used as an auxiliary loss during training. Incorporating this contrastive loss into the training can dramatically improve generalization after training, which is particularly important in the interactive agent setting because of the wide variety of possible tasks and even wider variety of possible task—visual observation pairs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
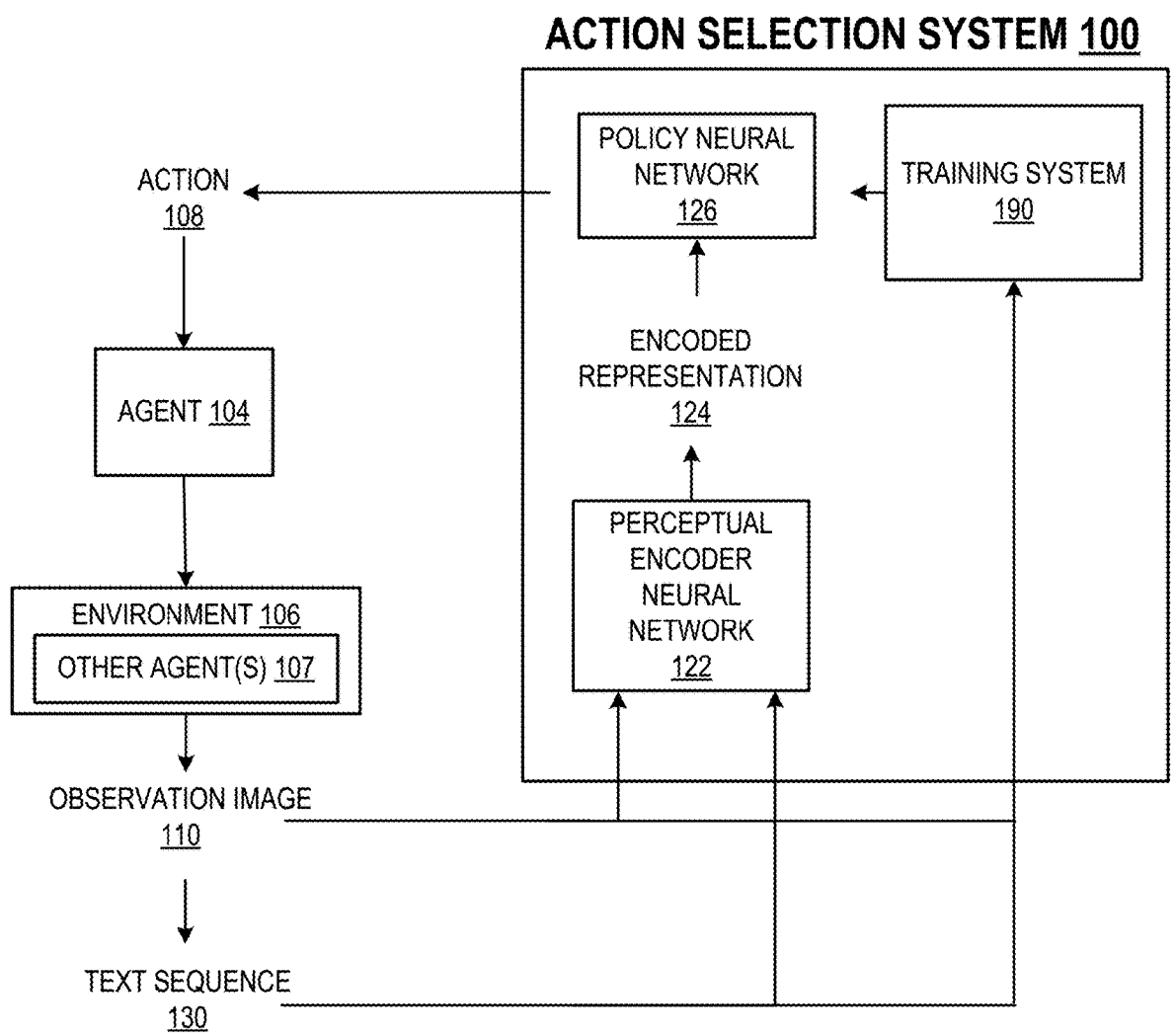
FIG. 1 shows an example action selection system.

FIG. 1 shows an example action selection system 100. The action selection system 100 is an example of a system implemented as computer programs on one or more computers in one or more locations in which the systems, components, and techniques described below are implemented.

The action selection system 100 controls an interactive agent 104 that is interacting in an environment 106 by selecting actions 108 to be performed by the agent 104 and then causing the agent 104 to perform the actions 108.

In particular, at each time step the system 100 receives a multi-modal input, e.g., an input that includes data of multiple modalities (e.g., data types), that includes at least an observation image 110 that characterizes the state of the environment at the time step and a natural language text sequence 130 and uses the multi-modal input to control the agent 104.

The agent 104 is referred to as an "interactive" agent because the agent 104 interacts with one or more other agents 107 in the environment as part of interacting with the environment. The one or more other agents 107 can include humans, other agents controlled by different computer systems, or both. The interactive agent 104 interacts with the other agent(s) 107 by receiving communications generated by the other agent(s) 107 and, optionally, generating text that is communicated to the other agent(s).

In particular, at each time step, the system 100 receives an observation image 110 characterizing the state of the environment 106 at the time step. The observation image 110 can be, e.g., captured by a camera sensor of the agent 104 or captured by another camera sensor located within the environment 106.

The system 100 also receives a natural language text sequence 130 for each the time step. In particular, the natural language text sequence 130 can be a result of a communication from one of the other agents 107 in the environment 106. For example, another agent 107 can speak an utterance (e.g., verbalize or express the utterance audibly) and the interactive agent 104 or the system 100 can transcribe the utterance to generate the natural language text sequence 130.

In some cases, there may not be a new communication at every time step. In these cases, the system 100 can use the most recently received natural language text sequence as the text sequence 130 for the time step. That is, the system 100 can re-use the most recently received natural language text sequence until a new text sequence is received.

Generally, the natural language text sequences 130 provide information about the task that the agent 104 should be performing in the environment 106, e.g., about the goal that the agent 104 should be attempting to reach by acting at the time step. However, because the text is natural language text that can be generated by another agent 107, the contents of the text may underspecify the goal, may be ambiguous with respect to which goal should be reached, or may require clarification. That is, the text sequence 130 may provide insufficient information for the agent 104 to carry out the task that is intended.

The system 100 then processes at least the observation image 110 and the natural language text sequence 130 using a perceptual encoder neural network 122 to generate an encoded representation 124 for the time step and then select one or more actions 108 to be performed by the agent in response to the observation, e.g., in response to the image 110 and the sequence 130, using the encoded representation 124.

In particular, in some implementations, the agent 104 performs a single action 108 in response to each observation image 110, e.g., so that a new observation image 110 is captured after each action that the agent performs. In these implementations, the system 100 causes the agent to perform the single action, e.g., by providing instructions to the agent 104 that when executed cause the agent to perform the single action, by submitting a control input directly to the appropriate controls of the agent 104, by providing data identifying the action to a control system for the agent 104, or using another appropriate control technique.

In some other implementations, the agent 104 performs a sequence of multiple actions 108 in response to each observation image 110, e.g., so that multiple actions are performed by the agent before the next observation image 110 is captured. In these implementations, the system 100 generates a sequence of multiple actions 108 that includes a respective action 108 at multiple positions and causes the agent 104 to perform the sequence of actions 108 according to the sequence order, e.g., by performing the action at the first position first, then the action at the second position, and so on. The system 100 can cause the agent 104 to perform a given action as described above.

Generally, the system 100 generates the one or more actions 108 at a given time step by generating a state representation from the encoded representation 124 (also referred to as an "aggregated embedding" below) and then processing the state representation using a policy neural network 126. The state representation can be the same as the encoded representation 124 or can be generated by a memory neural network, e.g., a recurrent neural network, so that the state representation can incorporate information from previous environment states.

In some implementations, in addition to or instead of performing one or more actions 108 in response to an observation image 110, the system 100 can generate and provide as output an output text sequence using the encoded representation 124 at some or all of the time steps. In particular, the system 100 can process an input derived from the encoded representation 124, e.g., an input that includes the state representation, using a natural language generation neural network to generate an output text sequence at the time step.

The system 100 can then generate speech representing the output text sequence and cause the interactive agent 104 to play back the speech or otherwise cause the output text sequence to be communicated to the other agent(s) 107 in the environment in order for the agent 104 to interact with the other agent(s) 107. Interacting with the other agents 107 by generating text or speech or both can allow the interactive agent 104 to ask questions of the other agent(s) 107 or otherwise obtain additional information about how to perform the desired task from the other agents 107, e.g., by prompting the other agent(s) 107 to provide additional information.

Processing input observations to generate action(s) and, optionally, output text sequences is described in more detail below with reference to FIGS. 2-6.

Prior to using the perceptual encoder neural network 122, the policy neural network 126 and, when used, the memory neural network and/or the text generation neural network to control the agent, a training system 190 trains the neural networks, e.g., to determine trained values of the parameters of the neural networks.

In some implementations, the system 190 trains the neural networks through imitation learning, e.g., on ground truth data generated by an expert agent. The ground truth data includes a set of ground truth trajectories that each include, at a sequence of time steps, an observation that includes an observation image and a natural language text sequence, and one or more of a ground truth action or a ground truth text output. A "ground truth" action is a target action that should be performed by the agent at a given time step (or a given position in an action sequence). Similarly, a "ground truth" text output is a target text output that should be generated by the system at a given time step. For example, the ground truth actions and text outputs can be the actual actions and text outputs (respectively) performed or generated (e.g., spoken) by the expert agent at a given time step. The expert agent can be, e.g., an agent that is controlled by a human user, an agent that is controlled by an already-learned policy, or an agent that is controlled by a hard-coded, heuristic-based policy.

In some other implementations, the system 190 trains the neural networks through reinforcement learning. For example, the system 190 can receive, at each time step, a reward in response to the action(s) performed in response to the observation at the time step, the text sequence generated as output at the time step, or both, and use the rewards to train the neural networks using an off-policy reinforcement learning technique.

In yet other implementations, the system 190 can first train the neural networks through imitation learning, and then fine-tune the neural networks through reinforcement learning.

Optionally, in any of the above implementations, the system 190 can use an auxiliary contrastive learning loss that employs cross-modality matching to improve the training of the neural networks. For example, the system can pre-train the perceptual encoder 122 using the auxiliary contrastive learning loss or can train the neural networks on a loss function that includes an imitation learning or a reinforcement learning loss and the auxiliary contrastive learning loss.

Cross-modality matching refers to having a discriminator neural network predict, from an encoded representation of a given observation—text sequence pair, whether the given observation and the given text sequence correspond to the same time step. An observation and a text sequence "correspond" to the same time step when the text sequence was the most recently received text sequence at the time step that the observation image was captured, e.g., when the text sequence and the observation image are temporally aligned.

Training using this auxiliary loss is described in more detail below with reference to FIG. 5.

In some implementations, the environment is a real-world environment and the agent is a mechanical agent interacting with the real-world environment, e.g., to perform one or more selected actions in the real-world environment. For example, the agent may be a robot interacting with the environment to accomplish a goal, e.g., to locate an object of interest in the environment, to move an object of interest to a specified location in the environment, to physically manipulate an object of interest in the environment in a specified way, or to navigate to a specified destination in the environment, that is specified by the natural language inputs received from other agent(s); or the agent may be an autonomous or semi-autonomous land, air, or sea vehicle navigating through the environment to a specified destination in the environment.

The actions may be control inputs to control a mechanical agent, e.g., a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example in the case of an autonomous or semi-autonomous land, air, or sea vehicle the actions may include actions to control navigation, e.g., steering, and movement, e.g., braking and/or acceleration of the vehicle.

In some implementations the environment is a simulated environment and the agent is implemented as one or more computer programs interacting with the simulated environment. For example, the environment can be a computer simulation of a real-world environment and the agent can be a simulated mechanical agent navigating through the computer simulation.

For example, the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle. As another example, the simulated environment may be a computer simulation of a real-world environment and the agent may be a simulated robot interacting with the computer simulation.

Generally, when the environment is a simulated environment, the actions may include simulated versions of one or more of the previously described actions or types of actions.

In some cases, the system can be used to control the interactions of the agent with a simulated environment, and the system can train the parameters of the neural networks (e.g., the perceptual encoder neural network 122, the policy neural network 126, and, when used, the language generation neural network) used to control the agent based on the interactions of the agent with the simulated environment. After the neural networks are trained based on the interactions of the agent with a simulated environment, the trained policy neural network can be used to control the interactions of a real-world agent with the real-world environment, e.g., to control the agent that was being simulated in the simulated environment. Training the deep neural network based on interactions of an agent with a simulated environment (e.g., instead of a real-world environment) can avoid wear-and-tear on the agent and can reduce the likelihood that, by performing poorly chosen actions, the agent can damage itself or aspects of its environment. In some cases, the system may be partly trained using a simulation as described above and then further trained in the real-world environment.

As another example, the environment can be a video game and the agent can be an agent within the video game that interacts with one or more other agents, e.g., agents controlled by one or more human users.

As yet another example, the environment can be an augmented reality or virtual reality representation of a real-world environment, and the agent can be an entity in the representation that interacts with one or more other agents, e.g., agents controlled by one or more human users. In the case of an augmented reality environment, the observation image may comprise image data characterizing the real-world environment, including for example, an object of interest in the environment. The agent may be a software agent configured to control an electromechanical device in the real-world environment to perform one or more selected actions in the real-world environment, such as manipulating, moving, fixing and/or reconfiguring the object. The augmented reality environment may be displayed to a user, e.g., through a head-mounted display or a heads-up display.

As yet another example, the environment can be a computing environment, e.g., one or more computing devices optionally connected by a wired or wireless network, and the agent can be a software agent executing within the computing environment to interact with a user. For example, the agent can be digital assistant software that carries out tasks specified by a user within the computing environment by performing actions that control one or more of the computing devices.

Figure 2:
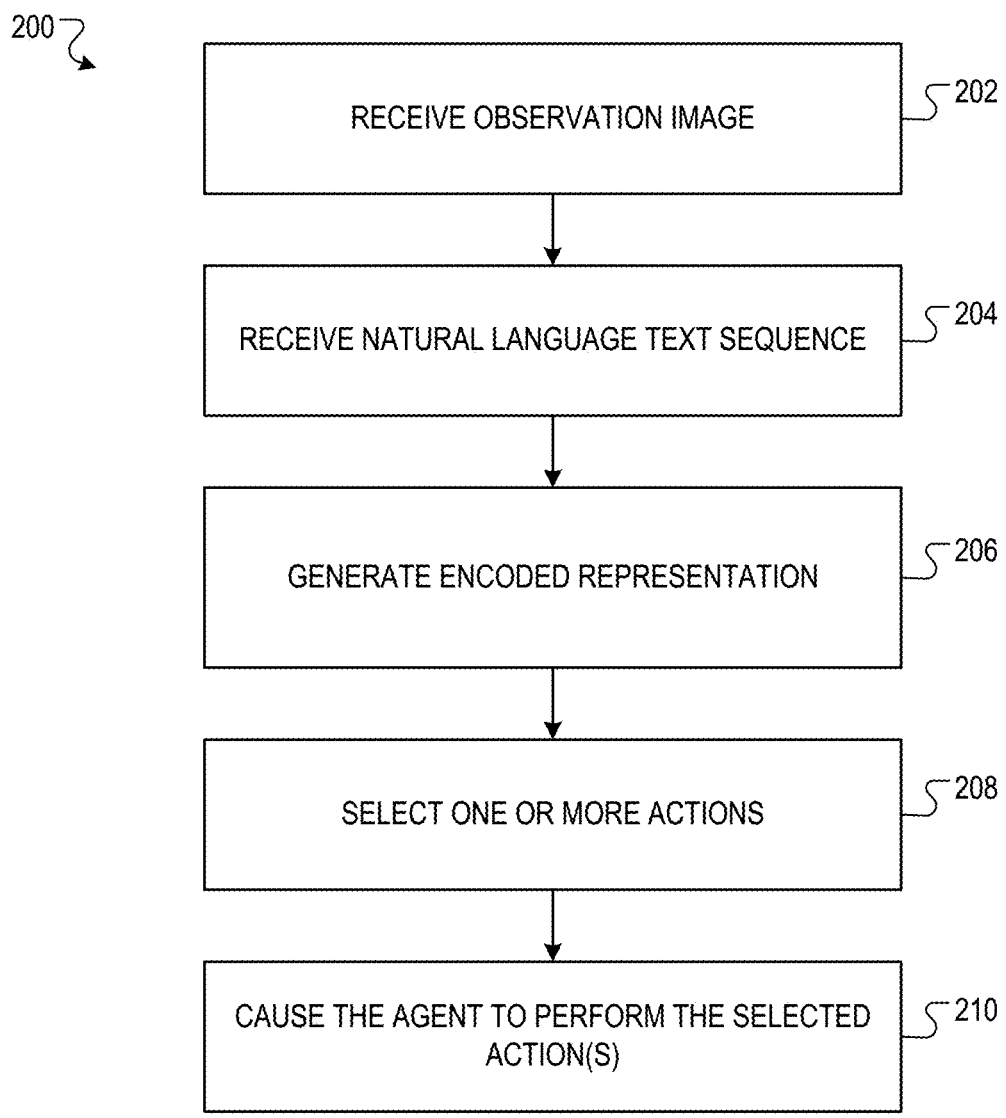
FIG. 2 is a flow diagram of an example process for controlling the agent at a time step.

FIG. 2 is a flow diagram of an example process 200 for selecting one or more actions at a time step. For convenience, the process 200 will be described as being performed by a system of one or more computers located in one or more locations. For example, an action selection system, e.g., the action selection system 100 of FIG. 1, appropriately programmed in accordance with this specification, can perform the process 200.

The system can perform the process 200 at each of multiple time steps to control the agent.

The system receives an observation image characterizing a state of the environment at the time step (step 202).

The system receives a natural language text sequence for the time step that characterizes a task being performed by the agent in the environment at the time step (step 204).

The system processes the observation image and the natural language text sequence using the perceptual encoder neural network to generate an encoded representation for the time step (step 206).

In some implementations, the perceptual encoder neural network includes an image embedding neural network that generates image embeddings representing the image observation, a text embedding neural network that generates text embeddings representing the image observation, and a multi-modal Transformer neural network that generates an aggregated embedding (that serves as the encoded representation).

An "embedding" as used in this specification is a vector of numeric values, e.g., floating point values or other values, having a pre-determined dimensionality. The space of possible vectors having the pre-determined dimensionality is referred to as the "embedding space." The image embedding and the text embeddings generated by the image and text embedding neural networks are generally in the same embedding space.

Generating an encoded representation when the perceptual encoder neural network has the above architecture is described below with reference to FIG. 3.

The system selects, using the aggregated embedding, one or more actions to be performed by the agent in response to the observation image (step 206) and causes the agent to perform the one or more selected actions (step 208).

Generally, the system processes a state representation derived from the encoded representation using a policy neural network to select the one or more actions.

That is, the system generates a state representation from the encoded representation and selects the one or more actions using the state representation, e.g., by processing the state representation using the policy neural network. In some implementations, the state representation is the same as the encoded representation. In some other implementations, the system generates the state representation by processing the encoded representation using a memory neural network, e.g., a neural network that allows the state representation to incorporate information from previous time steps. For example, the memory neural network can be a recurrent neural network, e.g., a long short-term memory (LSTM) neural network or a gated recurrent unit (GRU) neural network, to allow the state representation to incorporate information from previous time steps.

In some implementations, the system selects only a single action at each time step. In these implementations, the policy neural network can be, e.g., a multi-layer perceptron (MLP) or other feedforward neural network that generates a probability distribution over a set of actions and the system can greedily select or sample an action using the probability distribution. An alternative architecture for the policy neural network when a single action is selected is described below with reference to FIG. 4.

In some other implementations, the system selects a sequence of multiple actions at each time step. That is, the system generates a sequence of multiple actions that includes a respective action at multiple positions and causes the agent to perform the sequence of actions according to the sequence order, e.g., by performing the action at the first position first, then the action at the second position, and so on. An example of an architecture for a policy neural network that can generate a sequence of multiple actions is described below with reference to FIG. 4.

In some implementations, the policy neural network includes an action no-op neural network (e.g., an action "no operation" neural network, which may also be referred to as an "any-action" decision neural network) that the system uses to determine whether to cause the agent to perform any actions at the time step. In particular, in these implementations, the system can process the state representation using the action no-op neural network to generate an indication of whether any actions should be performed at the time step. Then, the system can only cause the agent to perform the one or more actions when the indication indicates that actions should be performed at the time step.

For example, the action no-op neural network can be an MLP that processes the state representation to generate a score. If the score satisfies a threshold value, the system can determine not to perform any actions at the time step.

In some implementations, to save computational resources, the system first processes the state representation using the action no-op neural network and then only performs the remainder of the processing of the policy neural network if the action no-op neural network indicates that one or more actions should be performed at the time step.

As described above, in some implementations, the system can also output a natural language text sequence at some or all time steps.

In these implementations, the system can process the state representation using a natural language generation neural network to generate an output text sequence for the time step. For example, the natural language generation neural network can be a Transformer that generates a sequence of text tokens conditioned on the state representation. For example, the Transformer can auto-regressively generate the output text tokens while cross-attending into the state representation or using the state representation as a prompt.

In some implementations, the system uses a text no-op neural network (e.g., a text "no operation" neural network, which may also be referred to as a text generation decision neural network) to determine whether to generate any output text at a given time step. In particular, in these implementations, the system can process the state representation using the text no-op neural network to generate an indication of whether text should be generated at the time step. Then, the system can only generate the output text sequence when the indication indicates that text should be generated at the time step.

For example, the text no-op neural network can be an MLP that processes the state representation to generate a score. If the score satisfies a threshold value, the system can determine not to generate any text at the time step.

In some implementations, to save computational resources, the system first processes the state representation using the text no-op neural network and then only processes the state representation using the language generation neural network if the text no-op neural network indicates that text should be generated at the time step.

While this specification generally describes that the observations are images, in some cases the observations can include additional data in addition to image data, e.g., proprioceptive data characterizing the agent or other data captured by other sensors of the agent. In these cases, the other data can be embedded jointly with the observation image by the image embedding neural network.

Figure 3:
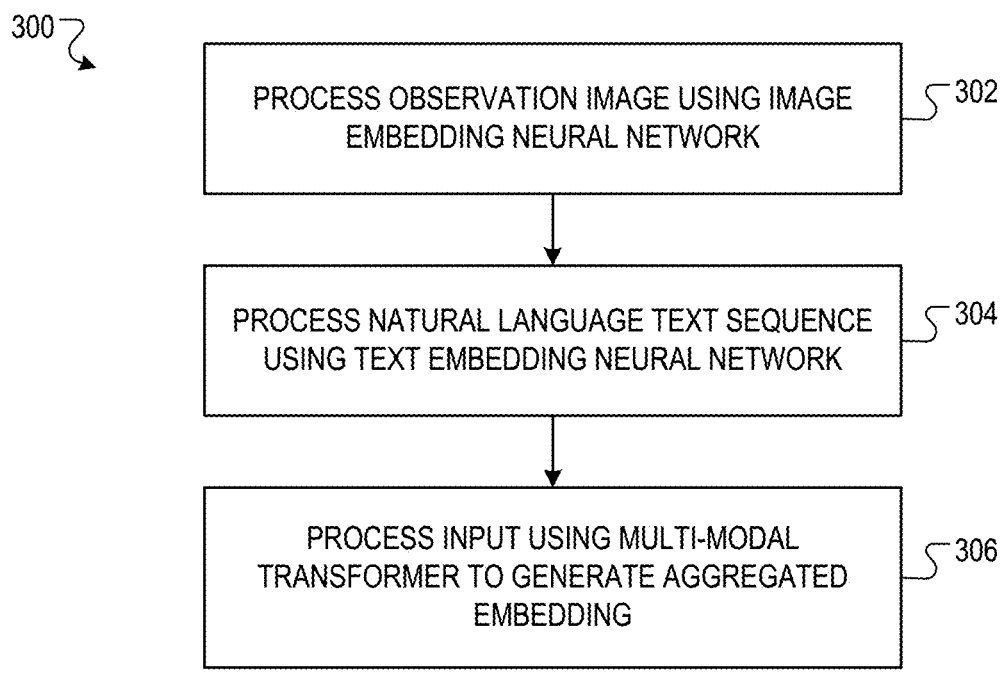
FIG. 3 is a flow diagram of an example process for generating an encoded representation at a time step.

FIG. 3 is a flow diagram of an example process 300 for generating an encoded representation at a time step using the perceptual encoder neural network. For convenience, the process 300 will be described as being performed by a system of one or more computers located in one or more locations. For example, an action selection system, e.g., the action selection system 100 of FIG. 1, appropriately programmed in accordance with this specification, can perform the process 300.

In the example of FIG. 3, the perceptual encoder neural network includes an image embedding neural network that generates image embeddings representing the image observation, a text embedding neural network that generates text embeddings representing the image observation, and a multi-modal Transformer neural network that generates an aggregated embedding (that serves as the encoded representation).

More specifically, the system processes the observation image using an image embedding neural network to generate a plurality of image embeddings that represent the observation image (step 302). For example, the image embedding neural network can be a convolutional neural network, e.g., a ResNet or an Inception neural network, that processes the observation image to generate a feature map that includes a respective image embedding for each of a plurality of regions in the observation image. As another example, the image embedding neural network can be a Vision Transformer neural network that processes a sequence of patches from the observation image to generate a respective image embedding of each of the patches in the sequence.

The system processes the natural language text sequence using a text embedding neural network to generate a plurality of text embeddings that represent the natural language text sequence (step 304). For example, the text embedding neural network can map text tokens, e.g., words or word pieces, in the text sequence to embeddings using a learned embedding table. As another example, the text embedding neural network can be an encoder-only Transformer that processes a sequence of the text tokens to generate a respective text embedding for each of the text tokens.

The system processes an input that includes the image embeddings and the text embeddings using a multi-modal Transformer neural network to generate an aggregated embedding that serves as the encoded representation (step 306).

The Transformer neural network is referred to as "multi-modal" because it receives as input embeddings of inputs of multiple different modalities, e.g., embeddings of both natural language text and images.

In some other implementations, the perceptual encoder neural network can use a different type of multi-modal neural network, e.g., a convolutional neural network or a recurrent neural network, to generate the aggregated embedding from at least the image and text embeddings.

More specifically, the multi-modal Transformer neural network is configured to (i) apply self-attention over at least the text embeddings and the image embeddings to generate respective updated embeddings for at least the plurality of text embeddings and (ii) generate the aggregated embedding from at least the respective updated embeddings for the text embeddings.

In particular, the multi-modal Transformer includes one or more self-attention layers that each have one or more self-attention heads, e.g., so that "applying self-attention" includes processing the input through the one or more self-attention layers. That is, each self-attention layer can perform either single-head self-attention and therefore have only one attention head or can perform multi-head attention and therefore have multiple heads that each perform self-attention in parallel. The self-attention layer can then combine the outputs of the multiple heads to generate an output of the attention mechanism for the self-attention layer, e.g., by summing, averaging, or concatenating the outputs and then optionally applying a linear transformation to the result. Each self-attention layer can also perform any of a variety of other operations, e.g., layer normalization, position-wise feed-forward neural network computations, residual connection operations, and so on.

Each head of each self-attention layer can apply any of variety of self-attention mechanisms over at least inputs corresponding to the image embeddings and the text embeddings. On example of such an attention mechanism will now be described.

In this example, the input to the multi-modal Transformer neural network includes the image embeddings, the text embeddings, and one or more dedicated embeddings. A "dedicated" embedding is one that is the same at each time step and is not dependent on the observation at the time step. For example, the dedicated embedding(s) can be learned during training of the neural network or can be fixed to pre-determined values.

The multi-modal Transformer then applies self-attention to generate respective updated embeddings for the text embeddings and the dedicated embeddings without updating the image embeddings.

As one example of this, each self-attention head of each self-attention layer can be configured to receive a head input that includes (i) the image embeddings generated by the image embedding neural network and (ii) respective current embeddings for the text embeddings and the dedicated embeddings. That is, if the head is not in the first self-attention layer, the head still receives the original image embeddings but receives current embeddings for the text embedding and the dedicated embeddings that have been updated by the preceding self-attention layer(s).

The head then generates, from the respective current embeddings, a respective query corresponding to each text embedding and each dedicated embedding, e.g., by applying a learned query linear transformation to each current embedding.

The head also generates, from the image embeddings and the respective current embeddings, a respective key corresponding to each image embedding, each text embedding, and each dedicated embedding, e.g., by applying a learned key linear transformation to each embedding.

The head also generates, from the image embeddings and the respective current embeddings, a respective value corresponding to each image embedding, each text embedding, and each dedicated embedding, e.g., by applying a learned value linear transformation to each embedding.

The head then applies query-key-value attention over the respective queries, keys, and values to generate a respective initial updated embedding for each text embedding and each dedicated embedding without updating the image embeddings. That is, the head applies self-attention over the text and dedicated embeddings but only "cross-attends" to the image embeddings (because the image embeddings are only used to generate keys and values and not queries).

When there are multiple heads, the self-attention layer can then combine the respective initial updated embeddings as described above.

Self-attention and query-key-value attention are described in more detail below.

Once the multi-modal Transformer has generated the respective updated embeddings for the text embeddings and the dedicated embeddings, the Transformer can generate the aggregated embedding from the respective updated embedding.

As a particular example, the Transformer can aggregate the respective updated embeddings for the text embeddings and the dedicated embeddings to generate an initial aggregated embedding and then combine the respective updated embeddings for the dedicated embeddings with the initial aggregated embedding to generate the aggregated embedding.

The Transformer can apply any of a variety of aggregation operations, e.g., pooling operations, to the respective updated embeddings for the text embeddings and the dedicated embeddings to generate the initial aggregated embedding. For example, the Transformer can apply feature-wise mean pooling to the respective updated embeddings for the text embeddings and the dedicated embeddings to generate the initial aggregated embedding.

The Transformer can combine the respective updated embeddings for the dedicated embeddings with the initial aggregated embedding in any of a variety of ways to generate the aggregated embedding. As one example, the Transformer can concatenate each respective updated embedding for each dedicated embedding and the initial aggregated embedding.

The system then uses the aggregated embedding as the state representation.

Figure 4:
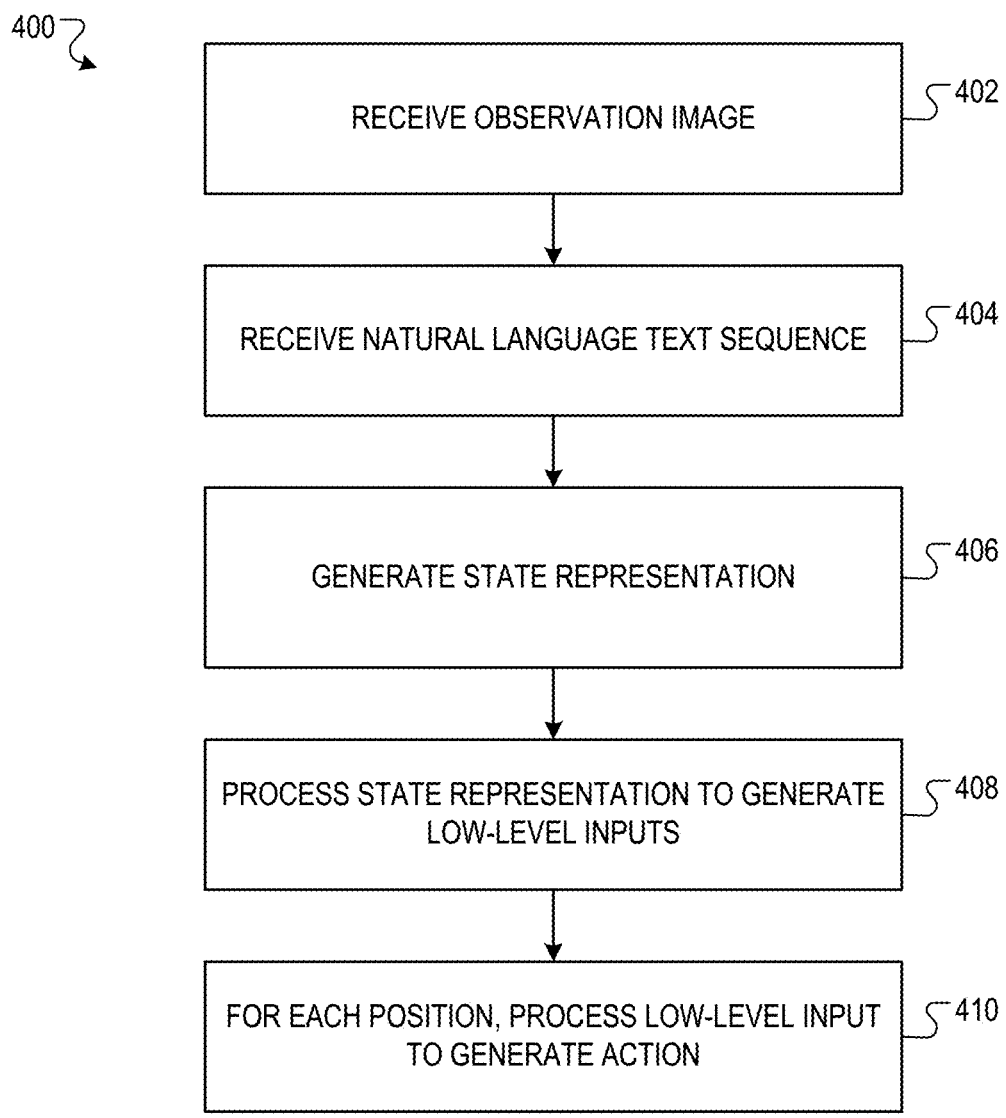
FIG. 4 is a flow diagram of an example process for generating a sequence of multiple actions.

FIG. 4 is a flow diagram of an example process 400 for generating a sequence of multiple actions at a time step. For convenience, the process 400 will be described as being performed by a system of one or more computers located in one or more locations. For example, an action selection system, e.g., the action selection system 100 of FIG. 1, appropriately programmed in accordance with this specification, can perform the process 400.

The system receives an observation image for the time step characterizing a state of the environment at the time step (step 402).

The system receives a natural language text sequence for the time step that characterizes a task being performed by the agent in the environment at the time step (step 404).

The system processes the observation image and the natural language text sequence to generate a state representation for the time step (step 406). For example, the system can generate the state representation as described above with reference to FIG. 2 or using a different set of neural networks with a different architecture.

The system generates a sequence of a plurality of actions to be performed by the agent in response to the observation image at the time step. As described above, the sequence has a respective action to be performed by the agent at each of a plurality of positions. In the example of FIG. 4, the policy neural network implements a hierarchical action selection scheme, e.g., a hierarchical control scheme, and therefore includes a high-level controller neural network and an action policy neural network.

In particular, the system processes the state representation using the high-level controller neural network to generate a respective low-level input for each position in the sequence (step 408). As a particular example, the high-level controller neural network can auto-regressively generate the respective low-level inputs for each position in the sequence after receiving as input the state representation. "Auto-regressively" generating the low-level inputs refers to generating the input for each position conditioned on the inputs for all positions that precede the position in the sequence. For example, the high-level controller neural network can be a recurrent neural network, e.g., an LSTM or a GRU, that, at the first processing time step, receives as input the state representations and, at each subsequent processing time step, receives as input the low-level input generated at the preceding processing time step.

For each position, the system processes the respective low-level input for the position using the action policy neural network to generate the action to be performed by the agent at the position in the sequence (step 410). In some implementations, each action is composed of multiple sub-actions. For example, when the agent is a robot or other mechanical agent, the sub-actions can include two or more of: a grab action that attempts to grab an object in the environment, a push/pull action that pushes or pulls an object in the environment, a rotate action that rotates one or more portions of the body of the agent, a look action that changes the orientation of the camera of the agent, and a move action that moves the agent in the environment. A control system for the agent can map these high-level actions into low-level commands, e.g., torques for the joints of the agent or other forces to be applied to portions of the body of the agent, in order to control the agent.

In these implementations, the action policy neural network can include a respective sub-network for each of the plurality of sub-actions. Thus, to process the respective low-level input for the position using the action policy neural network, for each of the plurality of sub-actions, the action policy neural network processes an input that includes the respective low-level input for the position using the sub-network for the sub-action to select a value for the sub-action for the position. For example, each sub-network can be configured to generate an output defining a probability distribution over possible values for the corresponding sub-action and the system can either greedily select the value for the sub-action or sample a sub-action using the probability distribution.

In some of these implementations, for at least one of the sub-actions, the input includes the value selected for one or more of the other sub-actions at the position. That is, the value of at least one sub-action at a given position can depend on the value of at least one other sub-action at the given position.

When only a single action is selected per time step, the policy neural network (i) can include only the respective sub-networks for each of the plurality of sub-actions and the input for each sub-network can include the state representation (instead of a low-level input) or (i) can include a feedforward high-level controller that maps the state representation to a single low-level input for a single position.

As described above, the policy neural network can also include an action no-op neural network that the system can use to prevent the agent from performing any actions at a given time step.

Figure 5:
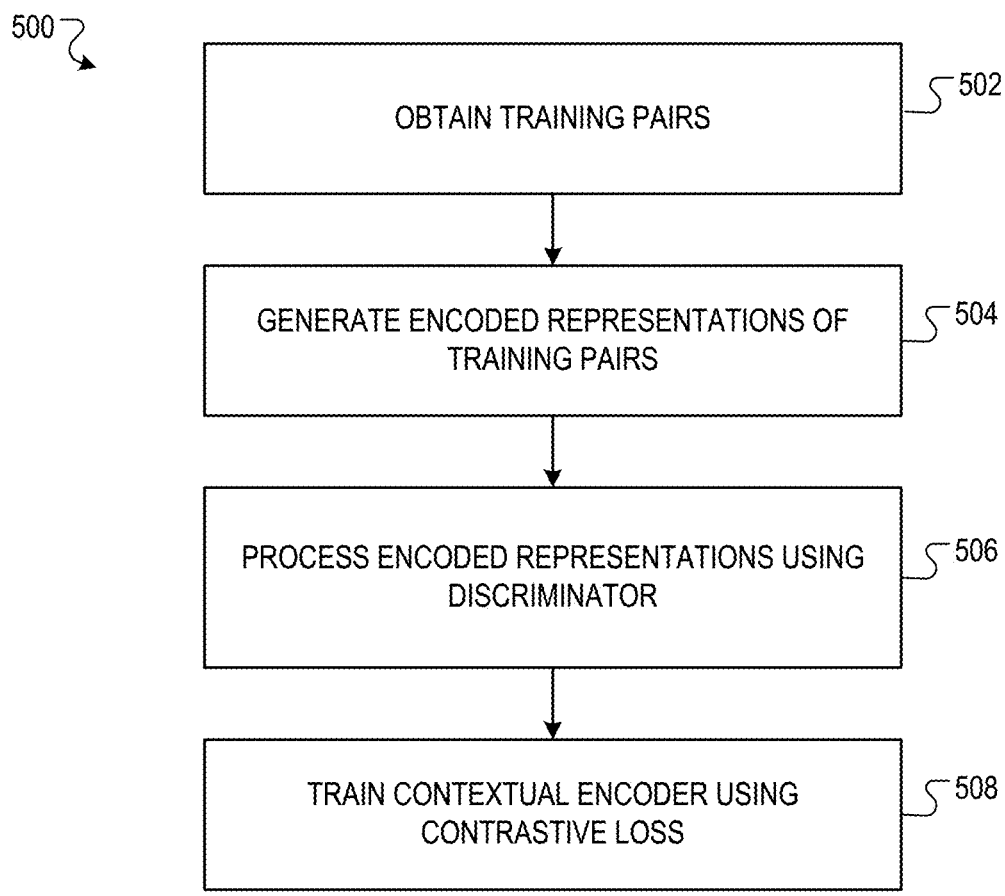
FIG. 5 is a flow diagram of an example process for training using an auxiliary contrastive loss.

FIG. 5 is a flow diagram of an example process 500 for training using the contrastive auxiliary loss. For convenience, the process 500 will be described as being performed by a system of one or more computers located in one or more locations. For example, a training system, e.g., the training system 190 of FIG. 1, appropriately programmed in accordance with this specification, can perform the process 500.

The system can repeatedly perform the process 500 on different mini-batches of training data to train the neural networks used by the action selection system on the contrastive auxiliary loss.

As described above, the system can pre-train the perceptual encoder neural network on the auxiliary loss. Alternatively, the system can train the perceptual encoder neural network while training all of the neural networks on a main loss, e.g., a reinforcement learning or imitation learning loss.

At each iteration of the process 500, the system obtains a mini-batch that includes a plurality of training pairs. The training pairs include (i) a first pair that has an observation image and a natural language text sequence that both correspond to the same time step, and (ii) one or more second pairs that each include an observation image and a natural language text sequence that correspond to different time steps. An observation and a text sequence "correspond" to the same time step when the text sequence was the most recently received text sequence at the time step that the observation image was captured, e.g., when the text sequence and the observation image are temporally aligned. For example, a first fraction of the pairs in the mini-batch can be "corresponding pairs" and the remainder can be "non-corresponding" pairs.

The system processes each training pair using the perceptual encoder neural network to generate a respective encoded representation for each training pair (step 504). For example, the perceptual encoder neural network can have any appropriate architecture, e.g., one of the architectures described above with reference to FIGS. 1-4 and below with reference to FIG. 6.

The system processes the respective encoded representation for each training pair using a discriminator neural network that is configured to process the respective encoded representations to generate, for each training pair, a respective discriminator score that represents a likelihood that the observation image and the natural language text sequence in the pair from which the encoded representation was generated correspond to the same time step (step 506). For example, the discriminator can a feedforward neural network, e.g., an MLP, that processes each encoded representation independently to generate the respective discriminator score for the corresponding training pair.

The system trains the perceptual encoder neural network using a loss based on the respective discriminator scores for each training pair (step 508). Such a loss may be described as a contrastive learning loss. The contrastive learning loss is referred to as a "contrastive" learning loss because it is based on "contrasting" the discriminator score for the first pair and the one or more discriminator scores for the one or more second pairs relative to one another.

Generally, the contrastive learning loss encourages the respective discriminator score for the first pair to be higher while encouraging the respective discriminator scores for the second pairs to be lower relative to the first pair. That is, the contrastive learning loss encourages the perceptual encoder neural network to generate state representations for corresponding pairs that are mapped to higher discriminator scores by the discriminator neural network than state representations for non-corresponding pairs, e.g., training the perceptual encoder neural network using the contrastive learning loss causes the perceptual encoder neural network to generate such state representations.

As a specific example, the contrastive learning loss can satisfy:

$$-\frac{1}{B}\sum_{n=1}^{B}\sum_{t=0}^{T}\left[\ln\left(D_\theta(o_{n,t}^V; o_{n,t}^L)\right) + \ln\left(1 - D_\theta(o_{n,t}^V; o_{SHIFT(n),t}^L)\right)\right],$$

where B is the number of trajectories in the mini-batch, T is the number of time steps in each trajectory in the mini-batch, $D_\theta(o_{n,t}^V; o_{n,t}^L)$ is the score generated by the discriminator from a pair that includes an observation image $o_{n,t}^V$ from time step t in the n-th trajectory and a text sequence $o_{n,t}^L$ from time step t in the n-th trajectory, and SHIFT(n) is the n-th index after a modular shift of the indices of the trajectories within the mini-batch (e.g., with 1 shifted to 2, . . . B−1 shifted to B, and B shifted to 1).

The system can train the perceptual encoder neural network using the contrastive learning loss by backpropagating gradients of the contrastive learning loss through the discriminator neural network and into the perceptual encoder neural network.

In addition to training the perceptual encoder, the system also trains the discriminator on an objective that encourages the discriminator to generate more accurate discriminator scores. In particular, the system trains the discriminator neural network on an objective function that measures, for the first training pair, an error between the respective discriminator score for the first training pair and a first score, e.g., one, that indicates that the observation image and the text sequence in the pair correspond to the same time step and, for each second training pair, an error between the respective discriminator score for the second training pair and a second score, e.g., negative one or zero, that indicates that the observation image and the text sequence in the pair do not correspond to the same time step.

When the contrastive loss is being used as an auxiliary loss during training of the neural networks, the system can also compute a gradient of the main loss.

For example, when the main loss is an imitation learning loss, the system can generate, from the encoded representation for the first training pair and using at least a policy neural network, a respective probability distribution over a set of actions for each of one or more positions in an action sequence, as described above.

The system also obtains data specifying a respective ground truth action performed by an expert agent at each of the one or more positions.

The system then trains at least the policy neural network and the perceptual encoder neural network based on a behavior cloning loss that measures, for each position in the action sequence, the probability assigned to the ground truth action at the position by the probability distribution for the position.

Figure 6:
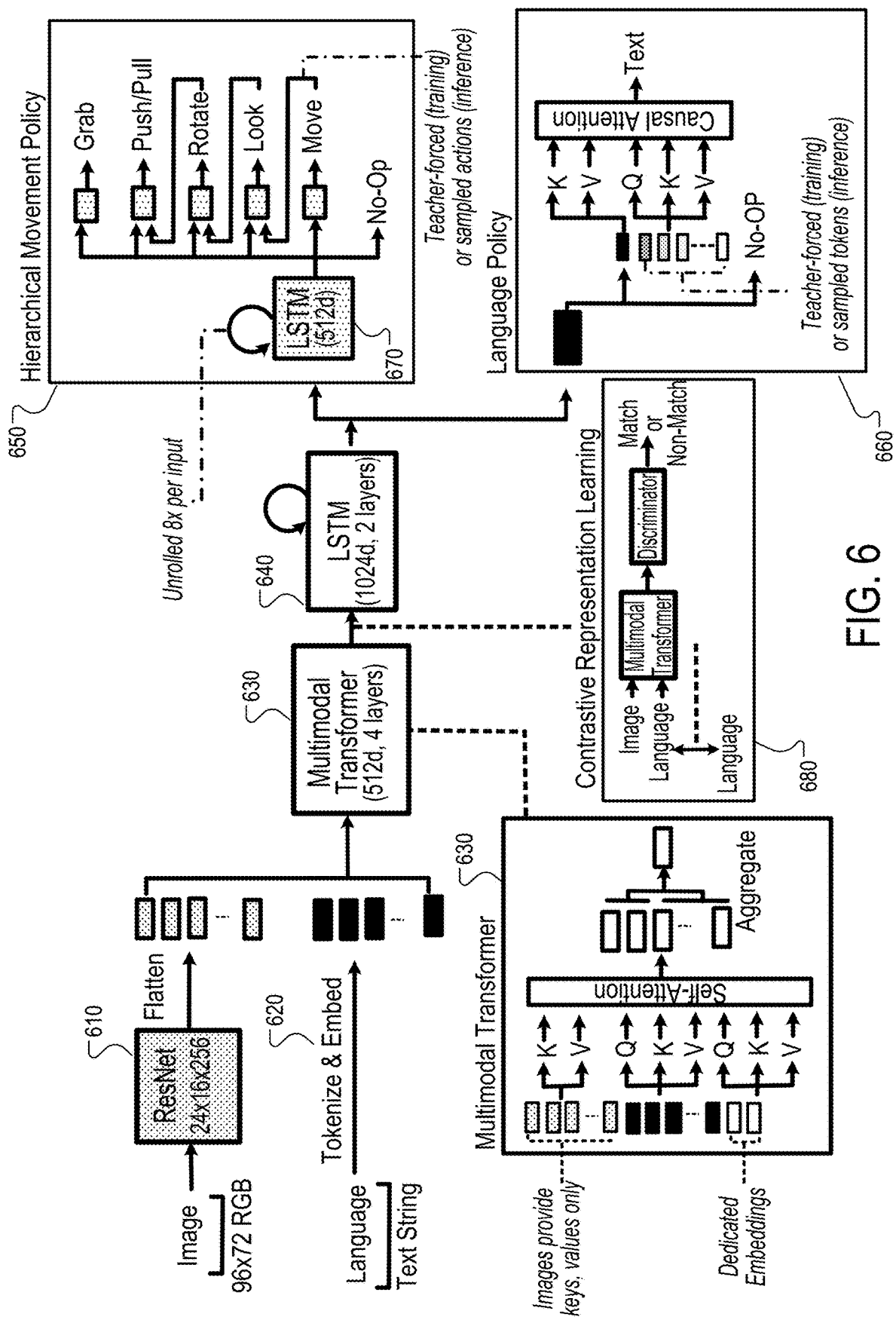
FIG. 6 shows a specific example architecture of the neural networks used by the action selection system during inference and during training.

FIG. 6 shows a specific example architecture of the neural networks used by the action selection system during inference and during training. In particular, in the example of FIG. 6, the perceptual encoder includes an image embedding neural network 610, a text embedding neural network 620, and a multi-modal Transformer 630. Moreover, at each time step, the system can generate both a sequence of multiple (8) actions and an output text sequence.

In particular, as shown in FIG. 6, the image embedding neural network 610 is a ResNet that generates a 24×16×256 feature map that is then flattened into (24×16) 256 dimensional embedding vectors.

The text embedding neural network 620 tokenizes and embeds the input natural language text string into a sequence of text embeddings using a learned embedding table.

The inputs to the multi-modal Transformer 630 include the image embeddings, the text embeddings, and two dedicated embeddings. The multi-modal Transformer operates on these inputs with 4 self-attention layers, each of which uses 512 dimensional embeddings. As described above, the image embeddings provide keys K and values V only while the text embeddings and the dedicated embeddings provide keys K values V and queries Q. After the self-attention layers, the multi-modal Transformer 630 aggregates the resulting text embeddings and dedicated embeddings to generate the aggregated embedding ("encoded representation").

After the aggregated embedding is generated, a memory neural network 640 (in the example of FIG. 6, an LSTM neural network that has four layers and uses 1024 dimensional vectors) generates the state representation from the aggregated embedding.

The state representation is then provided to a policy neural network ("hierarchical movement policy") 650 and to a language generation neural network ("language policy") 660.

When training using imitation learning, the training system uses "teacher forcing" to score the ground truth actions and ground truth text outputs using the respective policies. After training or when training using reinforcement learning, the system samples actions and text outputs using the respective policies and uses the sampled actions (and text outputs) to control the agent.

As can be seen from FIG. 6, the language generation neural network 660 includes a Transformer to generate the language output and a text no-op neural network to determine whether any text should be generated at a given time step. The Transformer uses the state representation to provide keys K and values V only to a causal attention mechanism.

Also, as can be seen from FIG. 6, the policy neural network 650 includes the high-level controller 670 (in the example of FIG. 6, an LSTM neural network with a single layer and 512 dimensional vectors), respective sub-networks for each of five sub-actions, and a text no-op neural network to determine whether any actions should be performed at the time step.

FIG. 6 also shows the use of the contrastive learning auxiliary loss 680 during training. As can be seen from FIG. 6, to train on this loss, the system receives a minibatch of modality pairings, e.g., pairs that include an observation image and a natural language text sequence. Some of the pairings (e.g., 50% of the pairings) in the mini-batch are within-sample pairings while the other pairings (e.g., the other 50% of the pairings) in the mini-batch are cross-sample modality pairings. A within-sample pairing is one where the observation image and the natural language text sequence correspond. A cross-sample pairing is one where the observation image and the natural language text sequence do not correspond.

The system processes each pairing using the perceptual encoder, including the multi-modal Transformer, to generate an encoded representation ("aggregated embedding") and then processes the encoded representation using a discriminator neural network to predict whether the observation image and natural language text sequence correspond or not ("match" or "non-match"). These predictions can then be used to train both the discriminator neural network and the perceptual encoder.

Figure 7:
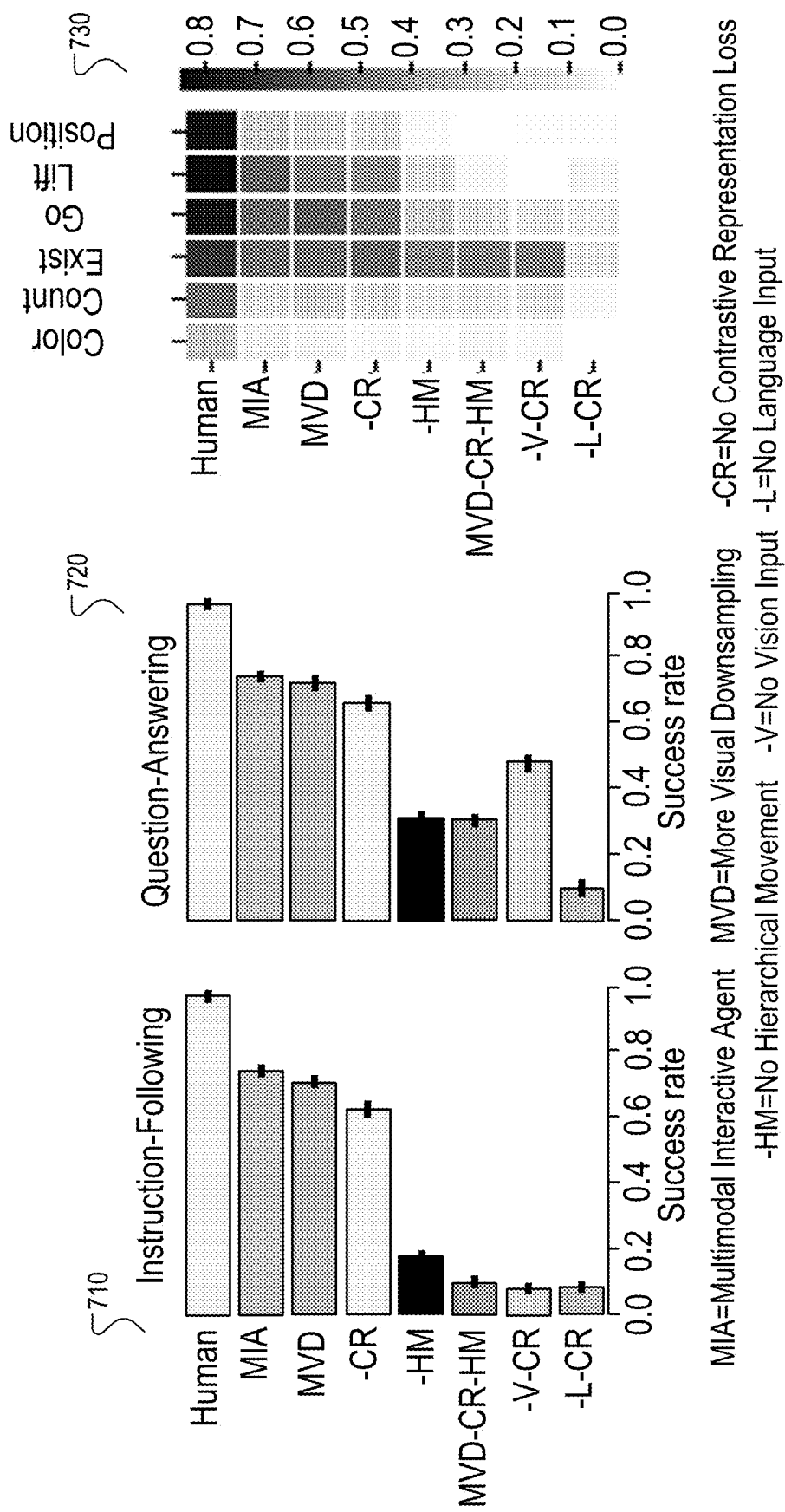
FIG. 7 shows the performance of various variants of the described techniques on a variety of agent control tasks.

FIG. 7 shows the performance of various variants of the described techniques on a variety of agent control tasks after a certain number of training steps have been performed.

In particular, FIG. 7 shows a first plot 710 that shows the performance of the variants on an instruction following task that requires the agent to move around the environment according to verbal instructions from one or more other agents, a second plot 720 that shows the performance of the variants on a question-answering task that requires the agent to answer questions about the environment from one or more other agents, and a third plot 730 that shows the performance of the variants on a variety of other tasks.

In particular, each plot in FIG. 7 shows the performance of variants of the described techniques relative to a human controlled agent ("human") on the corresponding task(s) in terms of success rate, i.e., what fraction of instances of the task the agent successfully completes after the relevant neural network(s) for the variant have been trained.

As can be seen in FIG. 7, one of the variants is a MIA (multimodal interactive agent) that uses the multi-modal Transformer and the hierarchical movement policy and that has been trained with imitation learning and the auxiliary contrastive representation loss. All of the other variants are a modification of the MIA agent, e.g., to further downsample the observation images, to remove the contrastive loss, to remove the hierarchical movement, to remove the vision input (the observation images), to remove the language input, and so on.

As can be seen from FIG. 7, processing multi-modal inputs as described above allows the techniques to achieve high success rates on language-specified tasks. Moreover, for some tasks, employing the hierarchical action selection policy significantly performs agent performance. Similarly, for some tasks, not training with the contrastive loss significantly negatively impacts agent performance.

Figure 8A:
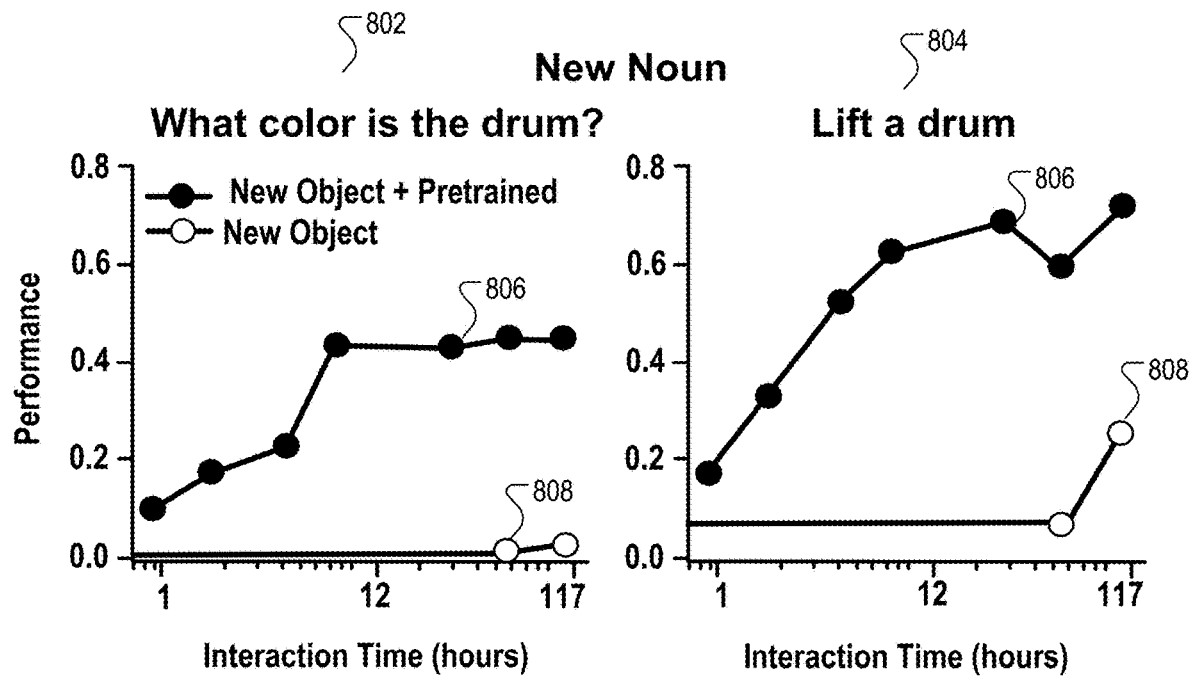
FIG. 8A shows how much data is needed to learn how to interact with a new, previously unseen object in the environment.

FIG. 8A shows how much data is needed to learn how to interact with a new, previously unseen object in the environment. In particular, FIG. 8A includes a first plot 802 for a "what color is the drum?" task (a task in which the agent is asked what color a drum in the environment is and must locate the drum and output text that specifies the color of the located drum) and a second plot 804 for a "lift a drum" task (a task in which the agent is asked to locate and lift a drum in the environment).

Both plots 802 and 804 show the performance on the corresponding task of an agent 806 that has been pre-trained as described above (in particular, with imitation learning and the auxiliary contrastive learning objective) on training data that does not include mentions of the noun "drum" and in environments where drums are not present. After the pre-training, the agent 814 is trained on additional data that includes varying amounts of training data where the new object (the drum) is present (and optionally some or all of the original training data). Different amounts of training data are shown on the x-axis and are represented in terms of interaction hours of the expert agent with the new object. Performance on the task is plotted on the y-axis in terms of the fraction of instances of the task that are successfully completed.

Both plots 802 and 804 also show the performance on the corresponding task of an agent 808 that has not been pre-trained and that is trained from scratch on the additional data that includes varying amounts of training data where the new object (the drum) is present (and optionally some or all of the original training data where the object is not present).

As can be seen from FIG. 8A, for a given amount additional training data, the pre-trained agent 806 performs significantly better than the non-pre-trained agent 808, showing that the described techniques allow agents to "learn" behaviors that can carry over to learning to interact with new objects in the environment.

Figure 8B:
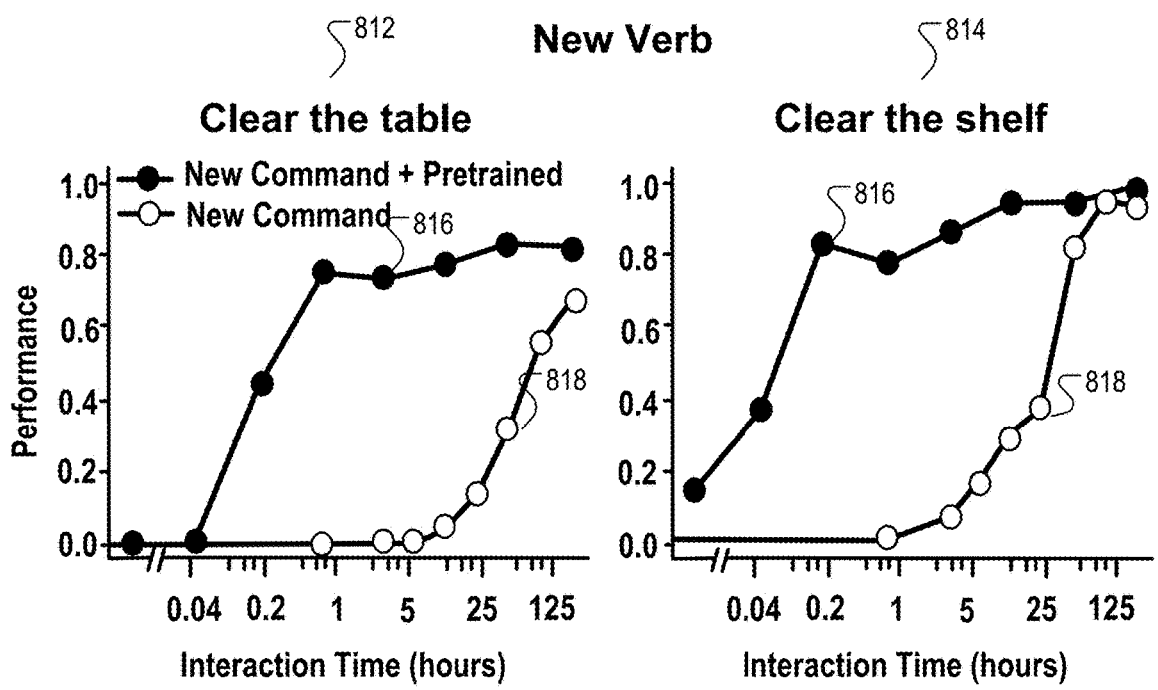
FIG. 8B shows how much data is needed to learn how to perform a new, previously unseen command in the environment.

FIG. 8B shows how much data is needed to learn how to perform a new, previously unseen command in the environment. In particular, FIG. 8B includes a first plot 812 for a "clear the table" task (a task in which the agent is asked to remove all objects from a table) and a second plot 814 for a "clear the shelf" task (a task in which the agent is asked to remove all objects from a shelf).

Both plots 812 and 814 show the performance on the corresponding task of an agent 816 that has been pre-trained as described above (in particular, with imitation learning and the auxiliary contrastive learning objective) on training data that does not include any instructions for the agent to clear any surfaces (thus, "clear" is a new verb). After the pre-training, the agent 816 is trained on additional data that includes varying amounts of training data where the new verb ("clear") is present (and optionally some or all of the original training data). Different amounts of training data are shown on the x-axis and are represented in terms of interaction hours of the expert agent with the new object. Performance on the task is plotted on the y-axis in terms of the fraction of instances of the task that are successfully completed.

Both plots 812 and 814 also show the performance on the corresponding task of an agent 818 that has not been pre-trained and that is trained from scratch on the additional data that includes varying amounts of training data where the new verb ("clear") is present (and optionally some or all of the original training data where the verb is not present).

As can be seen from FIG. 8B, for a given amount additional training data, the pre-trained agent 816 performs significantly better than the non-pre-trained agent 818, showing that the described techniques allow agents to "learn" behaviors that can carry over to learning to carry out new commands in the environment.

As described herein a transformer neural network ("Transformer") may be a neural network that is characterized by having a succession of attention neural network layers, in implementations, self-attention neural network layers. The transformer neural network is configured to apply the succession of attention neural network layers to an input sequence to generate an output sequence that comprises a transformed input element for each element of the input sequence. An attention neural network layer has an attention layer input for each element of the input sequence (e.g., input data, such as an embedding of image data and/or a text sequence, e.g., a natural language text sequence) and is configured to apply an attention mechanism over the attention layer input to generate an attention layer output for each element of the input sequence. The attention layer input and the attention layer output comprise vectors of the same dimension, and the attention neural network layers may have residual connections. Output of the attention mechanism may be further processed by one or more fully-connected, feed forward neural network layers.

In general, a self-attention neural network can be one that applies an attention mechanism to elements of an embedding (e.g., input data) to update each element of the embedding, e.g., where an input embedding is used to determine a query vector and a set of key-value vector pairs (query-key-value attention), and the updated embedding comprises a weighted sum of the values, weighted by a similarity function of the query to each respective key.

There are many different attention mechanisms that may be used. For example the attention mechanism may be a dot product attention mechanism applied by applying a query vector to respective key vector to determine respective weights for each value vector, then combining a plurality of value vectors using the respective weights to determine the attention layer output for each element of the input sequence.

In implementations of the present disclosure, the succession of attention neural network layers comprises different successive layers of the transformer neural network subsystem, each layer applying a different (learned) attention function. However the same attention neural network layer may be applied a succession of times, e.g., the same (learned) attention function may be applied multiple times, optionally a variable number of times. The attention mechanism may implement multi-head attention, that is, it may apply multiple different attention mechanisms in parallel. Each of the multiple attention mechanisms may then be referred as an attention head. The outputs of these may then be combined, e.g., concatenated, with a learned linear transformation applied to reduce to the original dimensionality if necessary. Generally in this specification the term "learned" refers to a function or value that has been adjusted during the training of the system.

In some implementations, the attention neural network layers of the transformer neural network maps n elements of the input sequence (input embedding/data) to n elements of an output sequence. The input sequence is received and processed in parallel by the attention neural network layers to generate the output sequence. For example each attention neural network layer after the first may have an attention layer input which includes a hidden state, and may generate an attention layer output comprising an activation for the hidden state for the next attention neural network layer. The attention layer output of the final attention neural network layer may be used to generate the elements of the output sequence.

In some implementations, the transformer neural network maps n elements of the input sequence to n elements of an intermediate sequence, and the elements of the intermediate sequence are then processed one at a time by an auto-regressive decoder to generate the output sequence.

The observation image, for example, be obtained from a camera or other image sensor, e.g., a LIDAR sensor (as used herein "image" includes a point cloud). The camera or other image sensor may be mounted on the agent or located separately from the agent in the environment. The observations may also include other sensor data such as object position data, data from a distance or position sensor, data from an actuator, or sensed electronic signals such as motor current or a temperature signal. In the case of a robot, the observations may also include data characterizing the current state of the robot, e.g., one or more of: joint position, joint velocity, joint force, torque or acceleration, e.g., gravity-compensated torque feedback, and global or relative pose of an item held by the robot or of one or more parts of the agent. Optionally, in any of the described implementations the observation at any given time step may include data from a previous time step that may be beneficial in characterizing the environment.

In general, the environment may comprise a real-world environment and each observation image may characterize the real-world environment and/or the agent may be a mechanical agent interacting with the real-world environment. The environment may comprise both a real-world environment and a simulated environment simultaneously, e.g., in the case of augmented or extended reality applications.

Encoded representations output by a perceptual encoder as described herein may be used for a number of different applications that involve observation images characterizing a state of an environment at different time steps and a natural language text sequence characterizing the environment. In some implementations, after a method of training a perceptual encoder neural network as described herein has been performed, encoded representations output by the trained perceptual encoder neural network may be used to control a mechanical agent interacting with the real-world environment, e.g., to select one or more actions for the mechanical agent to perform in the real-world environment using one or more encoded representations output by the perceptual encoder neural network. The perceptual encoder neural network may, for example, be trained using observation images characterizing a real-world environment and/or a simulated environment. The simulated environment may be configured using parameters derived from sensor data characterizing a real-world environment, such as data characterizing one or more objects within the real-world environment, e.g., respective positions and/or velocities of the one or more objects in the real-world environment. The encoded representations may alternatively or additionally be used to perform other tasks, e.g., image processing tasks. For example, the encoded representations may be used to perform a classification task, such as recognizing or identifying one or more objects and/or speakers in the environment. Alternatively or additionally, the encoded representations may be used to perform an object segmentation or scene decomposition task for an observation image, such as partitioning an observation image characterizing a real-word scene into multiple image segments, e.g., for the purposes of medical imaging or autonomous driving.

In implementations, a natural language text sequence may be provided by a user through a natural language text sequence input interface, such a computer keyboard or a transcription device configured to transcribe an audible utterance made by the user.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, e.g., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method performed by one or more computers and for controlling an agent interacting with an environment, the method comprising, at each of a plurality of time steps:
    receiving an observation image characterizing a state of the environment at the time step;
    receiving a natural language text sequence for the time step that characterizes a task being performed by the agent in the environment at the time step;
    processing the observation image using an image embedding neural network to generate a plurality of image embeddings that represent the observation image;
    processing the natural language text sequence using a text embedding neural network to generate a plurality of text embeddings that represent the natural language text sequence;
    processing an input comprising the image embeddings, the text embeddings, and a set of one or more dedicated embeddings using a multi-modal Transformer neural network to generate an aggregated embedding, wherein the multi-modal Transformer neural network is configured to (i) apply self-attention over at least the text embeddings and the image embeddings to generate respective updated embeddings for at least the plurality of dedicated embeddings and (ii) generate the aggregated embedding from at least the respective updated embeddings for the dedicated embeddings;
    selecting, using the aggregated embedding, one or more actions to be performed by the agent in response to the observation image; and
    causing the agent to perform the one or more selected actions.

2. The method of claim 1, wherein the multi-modal Transformer neural network comprises one or more self-attention layers that each have one or more self-attention heads, and wherein applying self-attention comprises processing the input through the one or more self-attention layers.

3. The method of claim 2, wherein the set of one or more dedicated embeddings are the same for each of the plurality of time steps and are not dependent on the observation images at the plurality of time steps.

4. The method of claim 3, wherein applying self-attention comprises generating respective updated embeddings for the text embeddings and the dedicated embeddings without updating the image embeddings.

5. The method of claim 3, wherein each self-attention head of each self-attention layer is configured to:
    receive a head input comprising (i) the image embeddings generated by the image embedding neural network and (ii) respective current embeddings for the text embeddings and the dedicated embeddings;
    generate, from the respective current embeddings, a respective query corresponding to each text embedding and each dedicated embedding;
    generate, from the image embeddings and the respective current embeddings, a respective key corresponding to each image embedding, each text embedding, and each dedicated embedding;
    generate, from the image embeddings and the respective current embeddings, a respective value corresponding to each image embedding, each text embedding, and each dedicated embedding; and
    apply query-key-value attention over the respective queries, keys, and values to generate a respective initial updated embedding for each text embedding and each dedicated embedding without updating the image embeddings.

6. The method of claim 3, wherein generating the aggregated embedding comprises:
    aggregating the respective updated embeddings for the text embeddings and the dedicated embeddings to generate an initial aggregated embedding; and
    combining the respective updated embeddings for the dedicated embeddings with the initial aggregated embedding to generate the aggregated embedding.

7. The method of claim 6, wherein the combining comprises concatenating each respective updated embedding for each dedicated embedding and the initial aggregated embedding.

8. The method of claim 1, wherein selecting, using the aggregated embedding, one or more actions to be performed by the agent in response to the observation image comprises:
    generating a state representation from the aggregated embedding; and
    selecting the one or more actions using the state representation.

9. The method of claim 8, wherein generating the state representation comprises processing the aggregated embedding using a memory neural network.

10. The method of claim 9, wherein the memory neural network is a recurrent neural network.

11. The method of claim 8, further comprising:
    processing the state representation using a natural language generation neural network to generate an output text sequence for the time step.

12. The method of claim 11, wherein the natural language text sequence is generated by transcribing a verbalized utterance from another agent in the environment, and wherein the method further comprises:
    generating speech representing the output text sequence for the time step; and
    causing the agent to verbalize the generated speech.

13. The method of claim 11, further comprising:
    processing the state representation using a text no-op neural network to generate an indication of whether text should be generated at the time step; and
    wherein processing the state representation for the time step using a natural language generation neural network to generate an output text sequence for the time step comprises:
    only generating the output text sequence when the indication indicates that text should be generated at the time step.

14. The method of claim 8, wherein selecting the one or more actions using the state representation comprises:
    processing the state representation using an action policy neural network to select a single action to be performed in response to the image observation.

15. The method of claim 8, wherein selecting the one or more actions using the state representation comprises:

processing the state representation to select a sequence of a plurality of actions to be performed in response to the image observation, the sequence comprising a respective action at each of a plurality of positions.

16. The method of claim 15, wherein processing the state representation comprises:
processing the state representation using a high-level controller neural network to generate a respective low-level input for each position in the sequence; and
for each position, processing the respective low-level input for the position using a policy neural network to select the action to be performed by the agent at the position in the sequence.

17. The method of claim 16, wherein the high-level controller neural network auto-regressively generates the respective low-level inputs for each position in the sequence after receiving as input the state representation.

18. The method of claim 17, wherein the high-level controller neural network is a recurrent neural network.

19. The method of claim 8, further comprising:
processing the state representation using an action no-op neural network to generate an indication of whether any actions should be performed at the time step; and
wherein causing the agent to perform the one or more actions comprises:
only causing the agent to perform the actions when the indication indicates that actions should be performed at the time step.

20. The method of claim 1, wherein the natural language text sequence is generated by transcribing a verbalized utterance from another agent in the environment.

21. A method performed by one or more computers and for controlling an agent interacting with an environment, the method comprising, at each of a plurality of time steps:
receiving an observation image for the time step characterizing a state of the environment at the time step;
receiving a natural language text sequence for the time step that characterizes a task being performed by the agent in the environment at the time step;
processing the observation image and the natural language text sequence to generate a state representation for the time step;
generating a sequence of a plurality of actions to be performed by the agent in response to the observation image at the time step, the sequence comprising a respective action to be performed by the agent at each of a plurality of positions, the generating comprising:
processing the state representation using a high-level controller neural network to generate a respective low-level input for each position in the sequence; and
for each position, processing the respective low-level input for the position using an action policy neural network to generate the action to be performed by the agent at the position in the sequence; and
causing the agent to perform the sequence of actions.

22. The method of claim 21, further comprising:
processing the state representation for the time step using a natural language generation neural network to generate an output text sequence for the time step.

23. The method of claim 22, wherein the natural language text sequence is generated by transcribing a verbalized utterance from another agent in the environment, and wherein the method further comprises:
generating speech representing the output text sequence for the time step; and
causing the agent to verbalize the generated speech.

24. The method of claim 22, further comprising:
processing the state representation using a text no-op neural network to generate an indication of whether text should be generated at the time step; and
wherein processing the state representation for the time step using a natural language generation neural network to generate an output text sequence for the time step comprises:
only generating the output text sequence when the indication indicates that text should be generated at the time step.

25. The method of claim 21, further comprising:
processing the state representation using an action no-op neural network to generate an indication of whether any actions should be performed at the time step; and
wherein causing the agent to perform the sequence of actions comprises:
only causing the agent to perform the sequence of actions when the indication indicates that actions should be performed at the time step.

26. The method of claim 21, wherein the high-level controller neural network auto-regressively generates the respective low-level inputs for each position in the sequence after receiving as input the state representation.

27. The method of claim 21, wherein the action policy neural network comprises a respective sub-network for each of a plurality of sub-actions, and wherein processing the respective low-level input for the position using an action policy neural network to generate the action to be performed by the agent at the position in the sequence comprises:
for each of the plurality of sub-actions, processing an input comprising the respective low-level input for the position using the sub-network for the sub-action to select a value for the sub-action for the position.

28. The method of claim 27, wherein, for at least one of the sub-actions, the input comprises the value selected for one or more of the other sub-actions at the position.

29. The method of claim 21, wherein processing the observation image and the natural language text sequence to generate a state representation for the time step comprises processing the observation image and the natural language text sequence using a perceptual encoder neural network that is configured to receive as input an observation image characterizing a state of an environment at a time step and a natural language text sequence characterizing the environment and to generate as output an encoded representation for the time step, and wherein the perceptual encoder has been trained by performing operations comprising:
obtaining a plurality of training pairs, the plurality of training pairs comprising:
(i) a first pair comprising an observation image and a natural language text sequence that both correspond to the same time step, and
(ii) one or more second pairs each comprising an observation image and a natural language text sequence that correspond to different time steps;
processing each training pair using the perceptual encoder neural network to generate a respective encoded representation for each training pair;
processing the respective encoded representation for each training pair using a discriminator neural network that is configured to process the respective encoded representations to generate, for each training pair, a respective discriminator score that represents a likelihood that the observation image and the natural language text sequence in the pair from which the encoded representation was generated correspond to the same time step; and training the perceptual encoder neural network using a contrastive learning loss based on the respective discriminator scores for each training pair.

30. The method of claim 29, wherein the contrastive learning loss encourages the respective discriminator score for the first pair to be higher while encouraging the respective discriminator scores for the second pairs to be lower.

31. The method of claim 29, wherein the discriminator neural network is a feedforward neural network that processes each encoded representation independently to generate the respective discriminator score for the corresponding training pair.

32. The method of claim 29, further comprising:
generating, from the encoded representation for the first training pair and using at least a policy neural network, a respective probability distribution over a set of actions for each of one or more positions in an action sequence;

obtaining data specifying a respective ground truth action performed by an expert agent at each of the one or more positions; and training at least the policy neural network and the perceptual encoder neural network based on a behavior cloning loss that measures, for each position in the action sequence, the probability assigned to the ground truth action at the position by the probability distribution for the position.

33. The method of claim 29, further comprising:
training the discriminator neural network on an objective function that measures, for the first training pair, an error between the respective discriminator score for the first training pair and a first score that indicates that the observation image and the text sequence in the pair correspond to the same time step and, for each second training pair, an error between the respective discriminator score for the second training pair and a second score that indicates that the observation image and the text sequence in the pair do not correspond to the same time step.

* * * * *